United States Patent [19]
Busching

[11] Patent Number: 5,105,974
[45] Date of Patent: Apr. 21, 1992

[54] LIQUID LEVEL SENSOR COVER FOR WASTE HOLDING TANK

[75] Inventor: Forrest B. Busching, Tacoma, Wash.

[73] Assignee: The Boeing Company, Seattle, Wash.

[21] Appl. No.: 548,525

[22] Filed: Jul. 5, 1990

[51] Int. Cl.⁵ .............................................. B65D 90/48
[52] U.S. Cl. .................................. 220/694; 220/465; 220/729; 137/392
[58] Field of Search ................. 73/325, 326; 137/192; 220/465, 694, 729

[56] References Cited

U.S. PATENT DOCUMENTS

| | | | |
|---|---|---|---|
| 2,217,579 | 10/1940 | White | 220/694 |
| 2,683,556 | 7/1954 | Morris et al. | 220/465 |
| 2,884,131 | 4/1959 | Mocarski | 137/392 |
| 4,537,329 | 8/1985 | Norton | 220/465 |
| 4,561,305 | 12/1985 | Tremain et al. | 73/325 |
| 4,875,497 | 10/1989 | Worthington | 137/392 |
| 4,948,010 | 8/1990 | Wiggins | 220/694 |

Primary Examiner—Stephen Marcus
Assistant Examiner—S. Castellano
Attorney, Agent, or Firm—Robert H. Sproule; Bernard A. Donahue

[57] ABSTRACT

A sensor which is installed in a waste tank to determine when the tank is full includes a shroud having a body with a curved surface and a leading edge which is mounted flushly to the inner surface of the tank wall and a trailing edge which is spaced apart from the sensor face. As waste material is swirled about the inside surface of the tank wall, the shroud causes the waste material to be transported above the sensor face without disrupting the flow of the waste material along the tank wall. The cover is sized and configured appropriately to allow convenient rinsing when the waste tank is emptied.

6 Claims, 4 Drawing Sheets

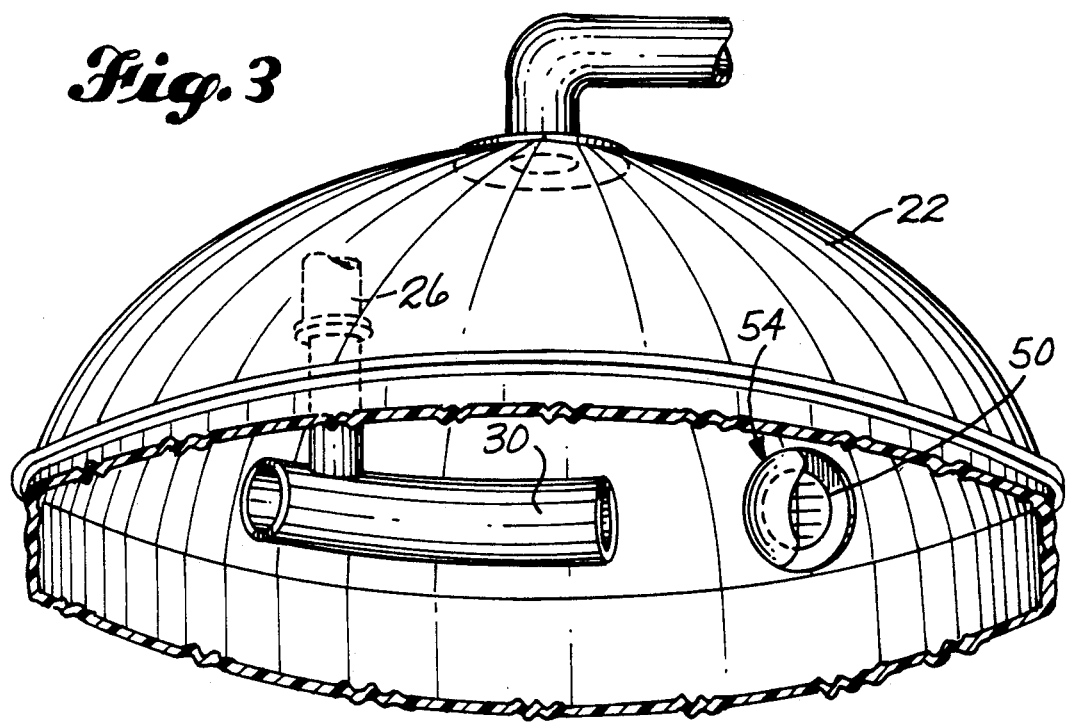
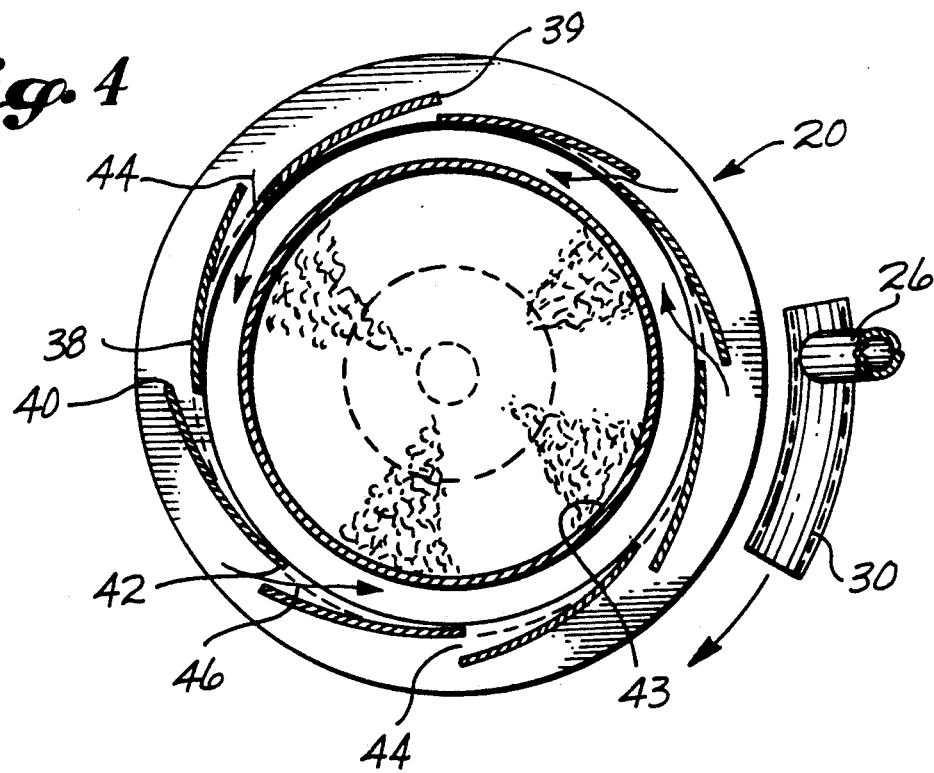

1

LIQUID LEVEL SENSOR COVER FOR WASTE HOLDING TANK

TECHNICAL FIELD

The present invention pertains to a cover for a sensor which senses the liquid level of an aircraft waste holding tank.

BACKGROUND OF THE INVENTION

Toilet systems have been developed for aircraft which use an air pressure differential to move waste from the toilets to a waste holding tank. During the flushing cycle, waste and flushing liquid mix with air as they travel to the waste holding tank. As the air, waste and flushing liquid enter the holding tank, air present within the holding tank passes from the tank through a vent outlet in the tank wall. In most instances, the air leaving the holding tank is vented overboard of the aircraft to the atmosphere. It is necessary that the air thus vented be free of liquid, foam and mist for both sanitary and aesthetic reasons. In order to accomplish this, these tanks have liquid/gas separators which separate the gases from the liquid and vent these gases overboard.

When the waste tanks become full, a sensor located inside the tank generates a signal which automatically shuts the tank off. However, waste liquid can leave a coating on these sensors causing them to generate a false signal indicating the tank is full when in fact it may be empty. This results in an inoperative toilet system. On passenger aircraft, such a failure can lead to vocal passenger dissatisfaction.

Conventionally, a number of deflectors for liquid level response devices have been disclosed. For example, U.S. Pat. No. 1,112,533 by Griffiths describes a compound lever ball-cock for a toilet in which a water deflection hood is included. In addition, various vacuum toilet systems have been disclosed including the system described in U.S. Pat. No. 4,521,925 by Chen et al, and assigned to the assignee of this application. Furthermore, U.S. Pat. No. 4,385,912 by Parrick et al, also assigned to the assignee of this application, describes a liquid/gas separator for a waste holding tank installed in an aircraft.

SUMMARY OF THE INVENTION

The environment of the present invention pertains to a waste holding system which includes a waste holding tank having an inner wall and an inlet pipe for directing waste into the tank such that the waste is caused to be distributed along the inner wall. A sensor is mounted on the inner wall in a manner to minimize disruption of the waste being distributed along the inner wall.

The present invention pertains to apparatus for covering the sensor so as to minimize disruption of the waste being distributed along the inner wall. The apparatus includes a leading edge which is mounted adjacent to the wall and a curved body, adjoining the leading edge, for directing the waste away from the wall and over the sensor. In addition the apparatus includes a trailing edge which adjoins the body and which is spaced apart from the sensor. The body extends from the leading edge located in front of the sensor away from the wall and rearwardly over the sensor in a curved manner and terminates the trailing edge. Waste travelling along the inner wall is caused to flow along the surface of the body and over the sensor past the trailing edge and along the inner wall without substantially disrupting the flow of the waste.

BRIEF DESCRIPTION OF THE DRAWINGS

The present invention will be described in greater detail in the following Detailed Description and by reference to the attached drawings, in which:

FIG. 3 is a cutaway partial isometric view of the waste holding tank and showing the sensor cover of the present invention;

FIG. 4 is a top sectional view showing an inside portion of the waste holding tank;

DETAILED DESCRIPTION

The present invention pertains to a cover for a waste level sensor installed in an aircraft waste holding tank. Before describing the present invention in further detail, a brief description of a conventional waste holding tank and its operation in a vacuum toilet system will be provided.

Figure 1:
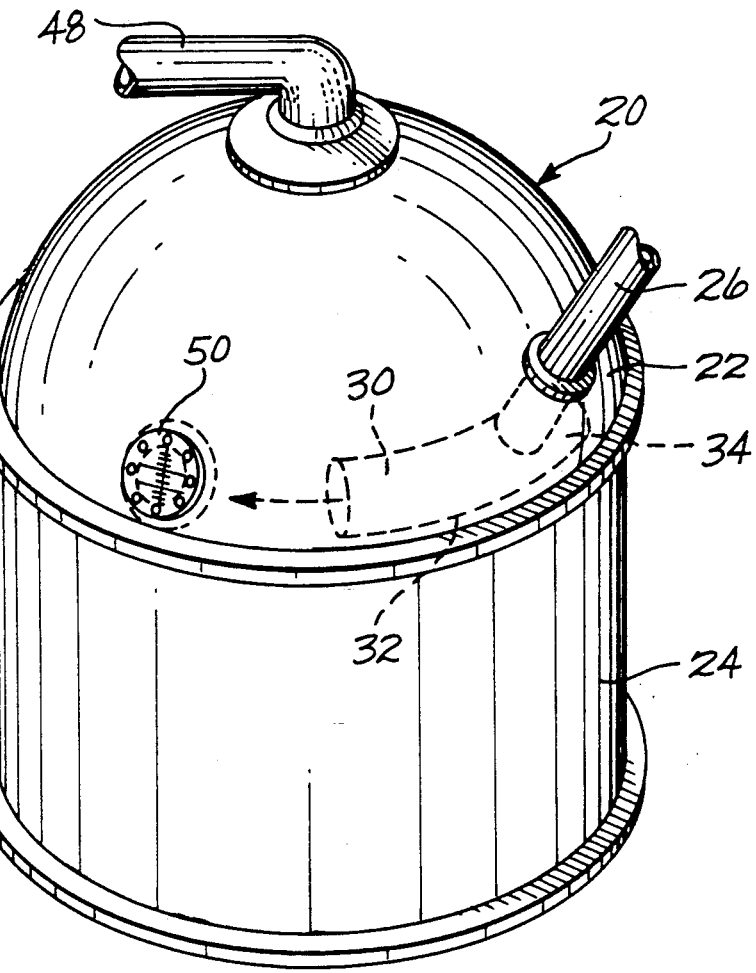
FIG. 1 is an isometric view of a conventional waste holding tank used in a vacuum toilet system.
Figure 2:
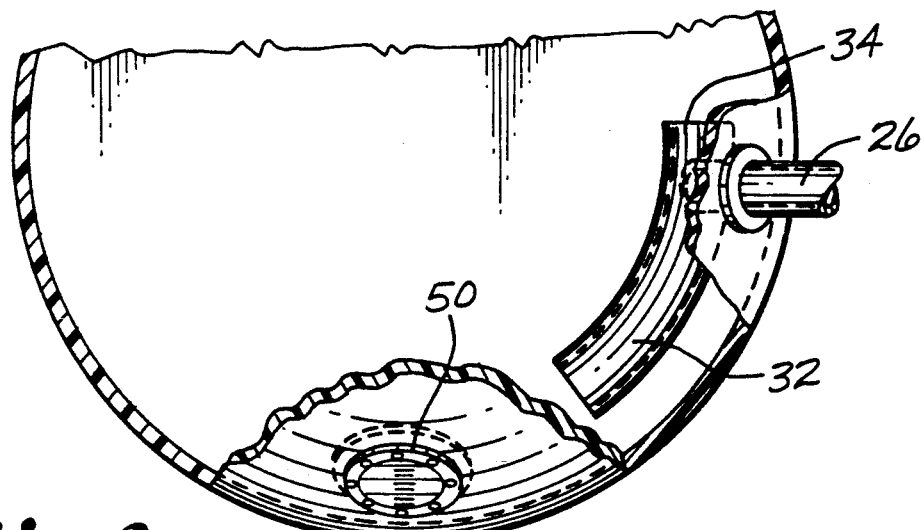
FIG. 2 is partially cutaway top view of the waste holding tank.

Referring first to FIG. 1 there is shown a conventional waste holding tank indicated at 20 including an inverted bowl-shaped top portion 22 joined to a cylindrical bottom portion 24. Waste matter enters the top of the tank via an inlet pipe 26 which tees with a distribution pipe 30 located horizontally inside the tank. More specifically, the distribution pipe 30 is curved in the same manner as the lower edge of the tank top 22. This allows the distribution pipe to be mounted adjacent to the inner surface of the tank top near the lower edge. As shown in FIG. 1, the distribution pipe 30 includes a longer portion 32 which is to the left of the inlet pipe 26 and a shorter portion 34 which is to the right of the inlet pipe. The longer portion 32 has a slight downward slope from right to left (when viewing FIG. 1) so that waste matter entering the tank through the inlet pipe is caused to flow into the longer portion of the distribution pipe in a right to left direction at a rapid velocity. In this manner, the waste matter is caused to swirl about the inner surface of the tank in a clockwise direction (when viewing FIG. 2).

During a flushing operation of the vacuum toilet a liquid/gas mixture from the vacuum toilet system enters the tank through the inlet pipe 26 and a substantial portion of the liquid, entrained in the gas stream, drops to the bottom of the tank due to gravity. A gas stream still having some liquid entrained therein moves in a substantially clockwise direction about the upper portion of the holding tank due to the directional force exerted by the tank distribution pipe. As the gas with liquid entrained therein moves about the interior of the tank it engages a liquid/gas separator located inside the tank. As shown in FIG. 4, the liquid/gas separator includes (i) a series of curved deflecting vanes 38 which are mounted about the inside of the tank and which form an outer boundary 39 of a gas circulation pathway as well as (ii) entry openings into the gas circulation pathway. The vanes 38 are arranged so that a first end 40 of each vane is closer to the inner surface of the tank wall than a second end 42. The vanes 38 are arranged circumferentially about the tank below a portion of the tank designated as the mist elimination chamber which is identified by a number 43. As the gas with liquid entrained therein moves about the interior of the tank and around the exterior of the liquid/gas separator, some of the liquid/gas enters the gas circulation pathway through openings 44 along path shown by the arrows identified by the number 46 and formed by the deflecting vanes 38.

In order to properly achieve the separation of the entrained liquids from the gases in the liquid/gas separator, it is important that flow of liquid and air from the distribution pipe 30 remain along the inside surface of the holding tank. As the gas stream enters the gas circulation pathway a substantially counterclockwise flow direction is imposed upon the gas due to the orientation of the deflecting vanes. While a majority of the liquid moves downward in the tank, the air with a major portion of the entrained liquid removed moves upwardly into the mist elimination chamber 43 and exits the separator through an exit pipe 48 (FIG. 1). From the exit pipe 48 the air is discharged overboard due to the pressure differential between the inside of the tank and the atmosphere.

Figure 5:
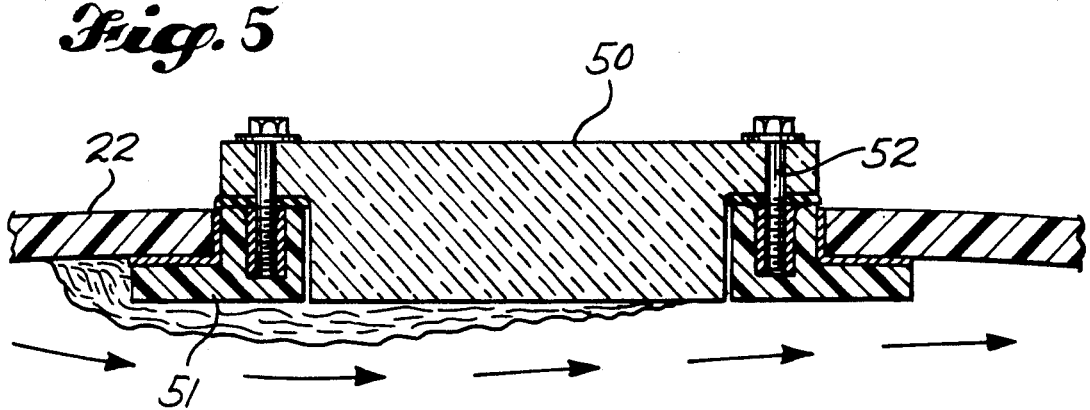
FIG. 5 is a side section view of the sensor without the cover and showing a waste flow pattern across the sensor.

In order to determine when the tank is full, there is provided a sensor 50 (FIG. 3) which is installed in an opening in the wall of the tank top 22 near its bottom edge. This may be a capacitance-type sensor which operates in a manner that as the level of the fluid relative to the sensor face increases, the capacitance measured by the sensor changes. As shown in FIG. 5, the sensor 50 has a cyclindrical configuration and is mounted nearly flush with the inner surface of the tank top so as not to disrupt the flow of air-borne waste material swirling around the inner surface of the tank. There is installed about sensor on the inside of the tank an annular seal 51 which is secured to the tank wall by means of fasteners 52.

Figure 6:
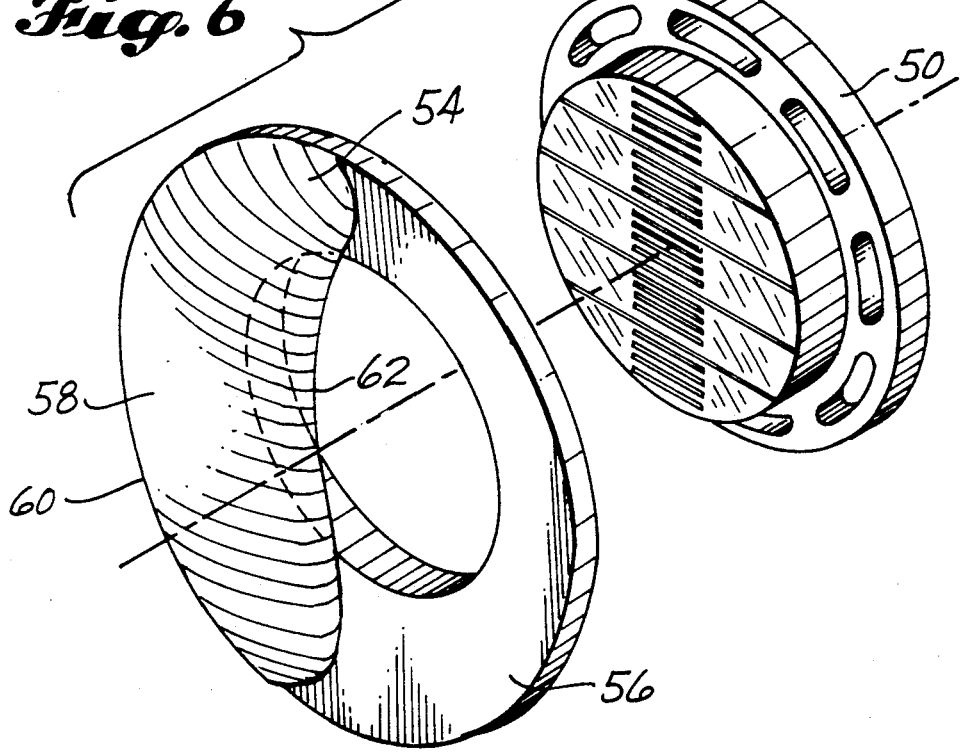
FIG. 6 is an isometric exploded view of the sensor and sensor cover.

Due to its location near the outlet of the distribution pipe 32, the sensor is subject to buildup of oily waste (as shown in FIG. 5) which can affect the proper operation of the sensor as discussed previously. In order to overcome this problem, there is shown in FIG. 6 a unique shroud indicated at 54 which is installed over the sensor 50 and which is fastened to the seal 51. The shroud 54 includes a leading edge 60 which is attached to the outer face of the seal 51 and a trailing edge 62 which is spaced apart from the sensor face about one inch and which extends across a majority of the surface of the sensor. This space between the shroud and sensor face is sufficently large to prevent objects from becoming entrapped therebetween.

More specifically, the shroud leading edge 60 (FIG. 8) follows the rounded contour of the seal perimeter between about the six o'clock position (identified by the number 64) and the twelve o'clock position (identified by the number 66). On the other hand, the trailing edge 62 includes a lower portion 63 which extends upward and rearward from the junction 64 in a curved manner to a rearward point 68 and then extends upward and forward in a curved manner forming a top portion 69 which joins with the junction 66.

Figure 8:
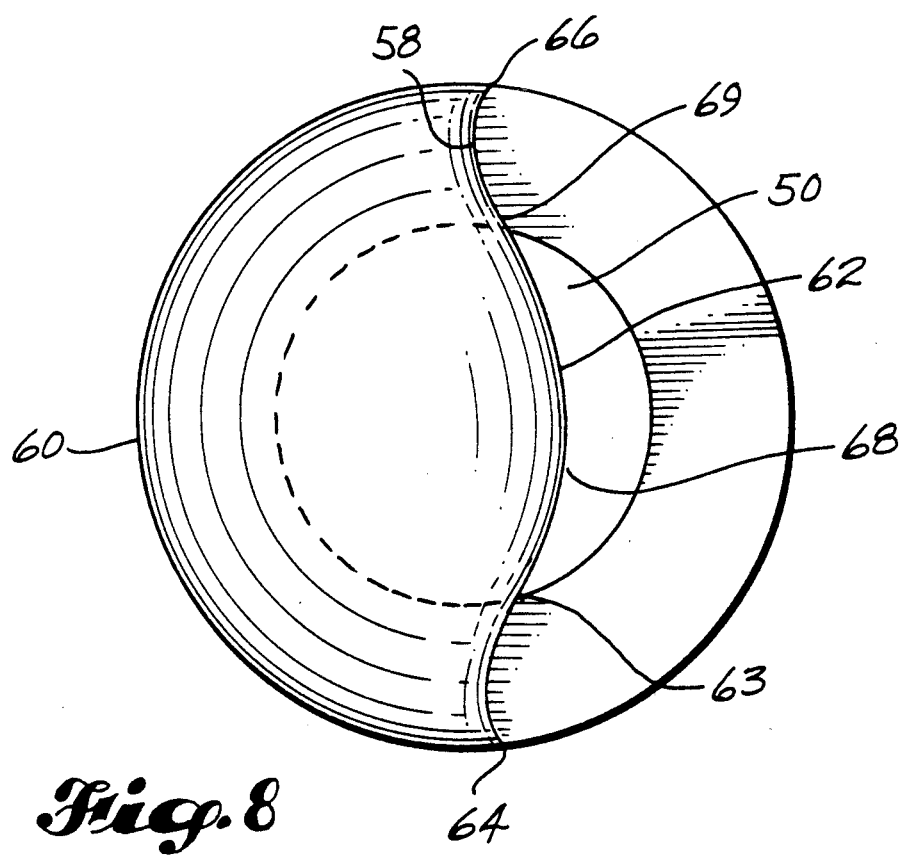
FIG. 8 is a front view of the sensor cover of the present invention.

As shown in FIG. 8, the shroud covers approximately eighty percent of the sensor face. This provides sufficient protection for the sensor face from the airborne oily waste being swirled around the inside of the tank. Furthermore, it leaves the sensor sufficiently exposed to allow clean water to rinse the sensor. That is, after emptying the waste tank on the ground, it is established practice to direct clean water into the tank to rinse it out. Some of this water is directed to the sensor face to aid in removing deposited waste therefrom. By minimizing the amount of the sensor face which is covered by the shroud, this aids in maximizing the amount of rinse water which can be directed to the sensor face to aid in its cleaning.

Figure 7:
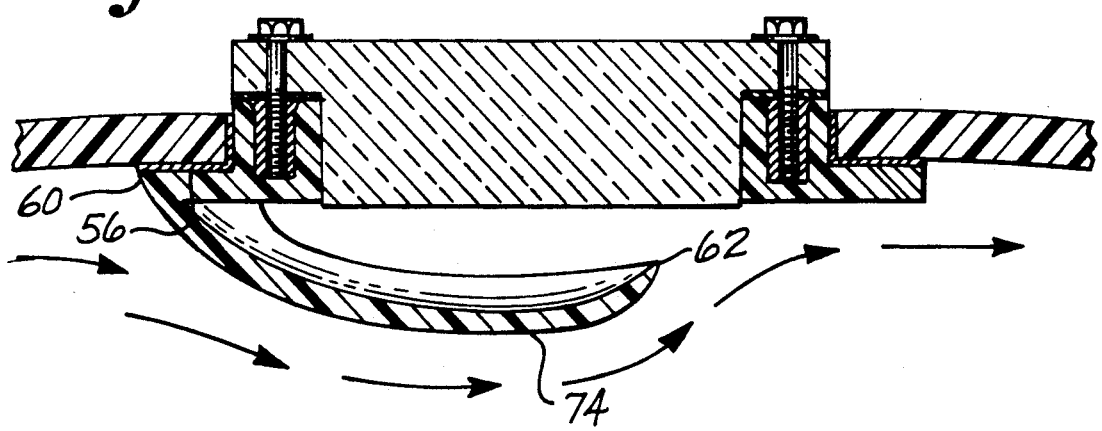
FIG. 7 is a side sectional view of the sensor and installed sensor cover showing a waste flow pattern across the cover.

The airflow pattern of the waste material across the shroud is shown in FIG. 7. It can be seen that the waste flow is along the inner sidewall of the tank until it is deflected by the shroud above the face of the sensor and then back along the inside surface of the tank. The dimension of the shroud as measured between the leading edge 60 and the trailing edge 62 is about eighty percent of the diameter of the sensor face. This is a sufficient dimension so that the waste material is carried over the entire sensor face. As further shown in FIG. 7, an outer surface 74 of the shroud has a curved configuration resembling the upper surface of an airplane wing. In this manner, the surface 74 extends inward toward the middle of the tank and rightward from the leading edge 60 to a location approximately midway across the sensor face and then outward toward the tank wall and rightward to the trailing edge 62. In this manner the waste material is smoothly elevated from the tank wall over the sensor and then guided back toward the wall where it continues along a path near the tank wall. The configuration of the shroud is such that any disruption in the flow of the waste material is minimized. That is, the airflow remains "attached" to the upper surface of the shroud in a smooth flowing manner. This allows the liquid/waste separator to function effectively in the manner described previously.

What is claimed is:

1. A waste holding system comprising:
  a. a waste holding tank having an inner wall;
  b. means for directing waste into the tank such that the waste is caused to flow along a path adjacent to the inner wall;
  c. a sensor mounted on the inner wall in a manner to minimize disruption of the waste flowing along the inner wall; and
  d. means for covering the sensor so as to minimize disruption of the waste flowing along the inner wall, the covering means includes (i) a leading edge which is mounted adjacent to the wall and which adjoins (ii) a curved body for directing the waste away from the wall and over the sensor and which adjoins (iii) a trailing edge which is spaced apart from the sensor, the body extending from the leading edge in front of the sensor away from the wall and rearwardly over the sensor in a curved manner and terminating at the trailing edge in a manner that waste travelling along the inner wall is caused to flow along the surface of the body and over the sensor past the trailing edge and along the inner wall without substantially disrupting the flow of the waste.

2. The system as set forth in claim 1 wherein the body covers less than the entire sensor to permit cleaning of the sensor, the body covering a majority of the sensor so that the velocity of the waste across the body is sufficient to carry the waste over an uncovered portion of the sensor and along the tank wall.

3. The system as set forth in claim 2 wherein the body is tapered in a direction rearward and toward the tank wall as it terminates at the trailing edge so that waste matter is caused to be redirected toward and along the tank wall after leaving the body.

4. In a waste holding system which includes (i) a waste holding tank having a curved inner wall and an inlet pipe for directing waste into the tank such that the waste is caused to be distributed along the inner wall and (ii) a sensor mounted on the inner wall so as minimize disruption of the waste being distributed along the inner wall, apparatus for covering the sensor so as to minimize disruption of the waste being distributed along the inner wall, the apparatus comprising a. a leading edge which is mounted adjacent to the wall;

b. a curved body, adjoining the leading edge, for directing the waste away from the wall and over the sensor; and c. a trailing edge, which adjoins the body and which is spaced apart from the sensor, the body extending from the leading edge in front of the sensor away from the wall and rearwardly over the sensor in a curved manner and terminating at the trailing edge in a manner that waste travelling along the inner wall is caused to flow along the surface of the body and over the sensor past the trailing edge and along the inner wall without substantially disrupting the flow of the waste.

5. The system as set forth in claim 4 wherein the body covers less than the entire sensor to permit cleaning of the sensor, the body covering a majority of the sensor so that the velocity of the waste across the body is sufficient to carry the waste over an uncovered portion of the sensor and along the tank wall.

6. The system as set forth in claim 4 wherein the body is tapered in a direction rearward and toward the tank wall as it terminates at the trailing edge so that waste matter is caused to be redirected toward and along the tank wall after leaving the body.

* * * * *